(12) United States Patent
Lowery et al.

(10) Patent No.: US 9,903,507 B2
(45) Date of Patent: *Feb. 27, 2018

(54) MICRO-POSITION GAP SENSOR ASSEMBLY

(71) Applicant: HORIBA STEC, Co., Ltd., Kyoto-shi, Kyoto (JP)

(72) Inventors: Patrick Allen Lowery, Reno, NV (US); John Thomas Dick, Reno, NV (US); Michael Alex Kramer, Sparks, NV (US)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,477

(22) Filed: Jun. 5, 2017

(65) Prior Publication Data
US 2017/0276257 A1    Sep. 28, 2017

Related U.S. Application Data

(63) Continuation-in-part of application No. 14/696,163, filed on Apr. 24, 2015, now Pat. No. 9,671,421.

(51) Int. Cl.
| | |
|---|---|
| *G01B 7/14* | (2006.01) |
| *F16K 37/00* | (2006.01) |
| *G01D 5/20* | (2006.01) |
| *G01D 11/24* | (2006.01) |
| *G01F 1/00* | (2006.01) |

(52) U.S. Cl.
CPC .......... *F16K 37/0041* (2013.01); *G01D 5/20* (2013.01); *G01D 11/245* (2013.01); *G01F 1/00* (2013.01)

(58) Field of Classification Search
CPC ...... G01D 5/2013; G01D 5/20; G01D 11/245; G01B 7/14
USPC ..................................... 324/207.22
See application file for complete search history.

(56) References Cited

U.S. PATENT DOCUMENTS

| | | | |
|---|---|---|---|
| 2,298,253 A | 10/1942 | Dillman et al. | |
| 5,251,871 A | 10/1993 | Suzuki | |
| 6,789,570 B2 * | 9/2004 | Beyrak | F16K 11/0716 137/554 |
| 8,704,538 B2 | 4/2014 | Grudzien | |

* cited by examiner

*Primary Examiner* — Reena Aurora
(74) *Attorney, Agent, or Firm* — Alleman Hall Creasman & Tuttle LLP

(57) ABSTRACT

A micro-position gap sensor assembly, including a structural housing, a flexible diaphragm fixedly attached at a first end of the structural housing, and a shaft orthogonally attached to the flexible diaphragm. The micro-position gap sensor assembly may further include a first retainer coupled to the shaft, a second retainer formed as a step of the structural housing, and a plate gap sensor. The plate gap sensor may include a non-contact sensor plate biased by a compression spring so that the non-contact sensor plate is held against a portion of the second retainer. The plate gap sensor may further include a target plate positioned adjacent the non-contact sensor plate and separated therefrom by a gap. The target plate may be biased by a return spring so that the target plate is held against a portion of the first retainer. The target plate may be coupled to the shaft.

14 Claims, 11 Drawing Sheets

MICRO-POSITION GAP SENSOR ASSEMBLY

CROSS REFERENCE TO RELATED APPLICATIONS

This patent application is a continuation-in-part of and claims priority to U.S. patent application Ser. No. 14/696,163, entitled MICRO-POSITION GAP SENSOR ASSEMBLY, filed Apr. 24, 2015, issuing as U.S. Pat. No. 9,671,421 on Jun. 6, 2017, the entire disclosure of which is hereby incorporated herein by reference.

BACKGROUND

With the ever present drive to miniaturize modern technology, one great challenge facing engineers is developing devices of ever smaller proportions that can operate reliably with high precision, in sometimes harsh environments. It may be desirable to provide such devices with small scale moving components such as actuators, position detectors, vibrations detectors, flow sensors, or detectors for small surface defects having displacements on the sub-millimeter or even sub-micrometer scale. However, it is difficult to equip such components with sensor systems that reliably measure such small displacements at these scales. It is also particularly difficult to do so with a sensor system that exhibits high signal to noise ratio across an entire range of displacement. Flow sensors and other devices for measuring fluids also present the additional engineering challenge of inhibiting exposure of the sensor and associated electrical circuitry to potentially corrosive fluids; therefore, there must be a physical barrier such as a non-permeable membrane between any sensors and the fluid media.

Additionally, flow sensors may be coupled to flow control valves. In this application, the flow sensor may be used to control the flow of fluid through a flow control valve. One well known type of flow control is mass flow control. In mass flow control, the flow sensor measures the mass flow of a fluid through a flow passage and then adjusts an associated flow control valve on the flow passage to cause the measured mass flow rate to trend toward a set point. Thus, in mass flow control, the mass flow rate of fluid through the system is constantly measured and used to adjust the flow control valve and thus to adjust the mass flow rate. It will be appreciated that mass flow control is subject to overshooting and undershooting the set point for the mass flow rate. To minimize the magnitude of the overshoots and undershoots, mass flow control systems are typically configured to adjust the flow control valve position slowly and/or incrementally. Therefore, one drawback to mass flow control systems is that they are generally slow to respond to sudden changes in the measured mass flow rate of the system. In circumstances in which nearly instantaneous change in flow rate is desired, mass flow control systems can lack sufficient responsiveness.

SUMMARY

To address the above challenges, a micro-position gap sensor assembly is disclosed. The disclosed micro-position gap sensor may include a structural housing and a flexible diaphragm fixedly attached at a first end of the structural housing forming a barrier against fluid ingress into the structural housing. The structural housing of the micro-position gap sensor assembly may include a shaft orthogonally attached to the flexible diaphragm, a first retainer, a second retainer, and a parallel plate gap sensor between the first retainer and the second retainer. The parallel gap plate sensor may include a non-contact sensor plate, the non-contact sensor plate biased at a first side against a portion of the first retainer defining a plane of the non-contact sensor plate and biased against the second retainer, and a target plate comprised of an electrically conductive material, wherein the target plate is configured such that a plane of the target plate is parallel to the plane of the non-contact sensor plate. The parallel plate gap sensor may be configured such that displacement of one of the target plate or the non-contact sensor plate caused by movement of the shaft, changes a distance between the target plate and the non-contact sensor plate.

In a first aspect of the present disclosure, the micro-position gap sensor assembly may be configured with the shaft orthogonally attached to flexible diaphragm, a first retainer including one or more standoffs, a second retainer, and a parallel plate gap sensor between the first and second retainer. The non-contact sensor plate may be biased on a top side against the one or more downward oriented standoffs of the first retainer. The non-contact sensor plate may be biased at a bottom side against the second retainer. The target plate may be fixedly attached to the shaft such that a plane of the target plate is parallel to the plane of the non-contact sensor plate and such that small displacements of the shaft may change a distance between the target plate and the non-contact sensor plate. A printed circuit board may be coupled to the non-contact sensor plate and configured to output a signal indicating the distance between the non-contact sensor plate and the target plate.

In this first aspect of the present disclosure, the non-contact sensor plate may include one or more sensing sensor regions within a high strength alloy or ceramic plate. Further, the target plate may be similarly configured with the electrically conductive material bonded to a high strength alloy or ceramic plate to reduce the possibility of plastic deformation of the non-contact sensor plate and target plate due to compression forces applied during assembly and operation of the micro-position gap sensor assembly.

In a second aspect of the present disclosure an alternative configuration of the micro-position gap sensor assembly is disclosed. In this second aspect, the structural housing, flexible diaphragm, and shaft are oriented such that the shaft is vertical and centered within the structural housing. However, unlike the first aspect, the first retainer may be configured with one or more standoffs extending upward around the target plate to bias against the non-contact sensor plate. Target plate may be fixedly attached to the shaft and may include a sleeve electrically isolating the conductive paramagnetic regions of the target plate from the shaft. As in the first aspect, printed circuit board may be physically and electrically coupled to non-contact sensor plate. The second retainer may then be positioned between non-contact sensor plate and a wave compression spring ring. In this aspect, the wave compression spring ring may be compressed by a cap threaded into structural housing. A jam retainer may be fixedly attached to shaft.

In a third aspect of the present disclosure, the micro-position gap sensor assembly may be coupled to a prime mover or actuator and a flow control valve. A prime mover housing may be coupled to the non-contact sensor assembly and may house a prime mover or actuator element, a bearing, a actuator return spring compression member, a second retainer, and, optionally, a locking spring for the prime mover housing. The micro-position gap sensor assembly may be configured such that the bearing may mechanically couple the prime mover or actuator element to the actuator return spring compression member. The actuator return spring compression member may be attached to the shaft of the micro-position gap sensor assembly.

The structural housing of the micro-position gap sensor array may include a top body piece and a bottom body piece. The structural housing may include one or more gap adjustment shims between the top body piece and the bottom body piece when assembled to establish a gap between the target plate and the non-contact sensor plate. Further, the target plate may be attached to a bottom side of top body piece. The top body piece may be installed into the bottom body piece applying a downward compressive force on a first retainer. A portion of the first retainer may bias against a first side the non-contact sensor plate. The non-contact sensor plate may be configured such that the plane of the non-contact sensor plate is parallel to the plane of the target plate and such that displacements of the shaft may move the non-contact sensor plate, thereby changing the distance between the target plate and the non-contact sensor plate. Additionally, an upward biasing force is transmitted from the second retainer through the actuator return spring compression member and shaft to the non-contact sensor plate as discussed above the non-contact sensor plate may be physically and/or electrically coupled to the non-contact sensor plate.

In some aspects, the disclosed micro-position gap sensor assembly may be coupled to a flow control valve. When so coupled, the disclosed micro-position gap sensor assembly may provide the advantage of yielding an accurate and thermally stable indication of the position of the flow control valve. Such a configuration also provides the advantage of directly measuring the position of the valve. Therefore, if desired, the micro-position gap sensor assembly may be used to command a calculated flow rate without using flow control techniques that rely upon feedback control to trend toward a set point, such as mass flow control. Rather, the disclosed micro-position gap assembly can be used to nearly instantaneously command changes in flow rate. The commanded flow rate is achieved by calculating the opening position of the valve required at a current measured pressure in the flow passage to yield the desired flow rate, and then commanding the valve to move to the calculated valve position, while confirming the valve position through the accurate micro-position gap sensor assembly described herein. Such direct control may be used to make nearly instantaneous changes to the flow rate of the fluid within the system.

In another aspect of the present disclosure, the micro-position gap sensor assembly may comprise a structural housing having a sidewall at least partially surrounding a central region. The micro-position gap sensor assembly may further include a flexible diaphragm fixedly attached at a first end of the structural housing forming a barrier against fluid ingress into the central region of the structural housing. The micro-position gap sensor assembly may further include a shaft orthogonally attached to the flexible diaphragm and extending in an orthogonal direction to a surface of the flexible diaphragm through the central region of the structural housing towards a second end of the structural housing opposite the first end. The micro-position gap sensor assembly may further include a first retainer formed as an inwardly extending step in the sidewall of the central region of the structural housing, and a second retainer including a compression spring, one end of the second retainer being secured against movement in the orthogonal direction. The micro-position gap sensor assembly may further include a plate gap sensor, the plate gap sensor including a non-contact sensor plate and a target plate positioned adjacent the non-contact sensor plate and separated therefrom by a gap. One of the target plate and non-contact sensor plate may be configured to follow the movement of the shaft, and the other of the target plate and non-contact sensor plate may be retained by a biasing force of the second retainer, by being biased against the first retainer. Displacement of the one of the target plate and non-contact sensor plate that follows the movement of the shaft, caused by movement of the shaft, may change a distance between the target plate and the non-contact sensor plate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
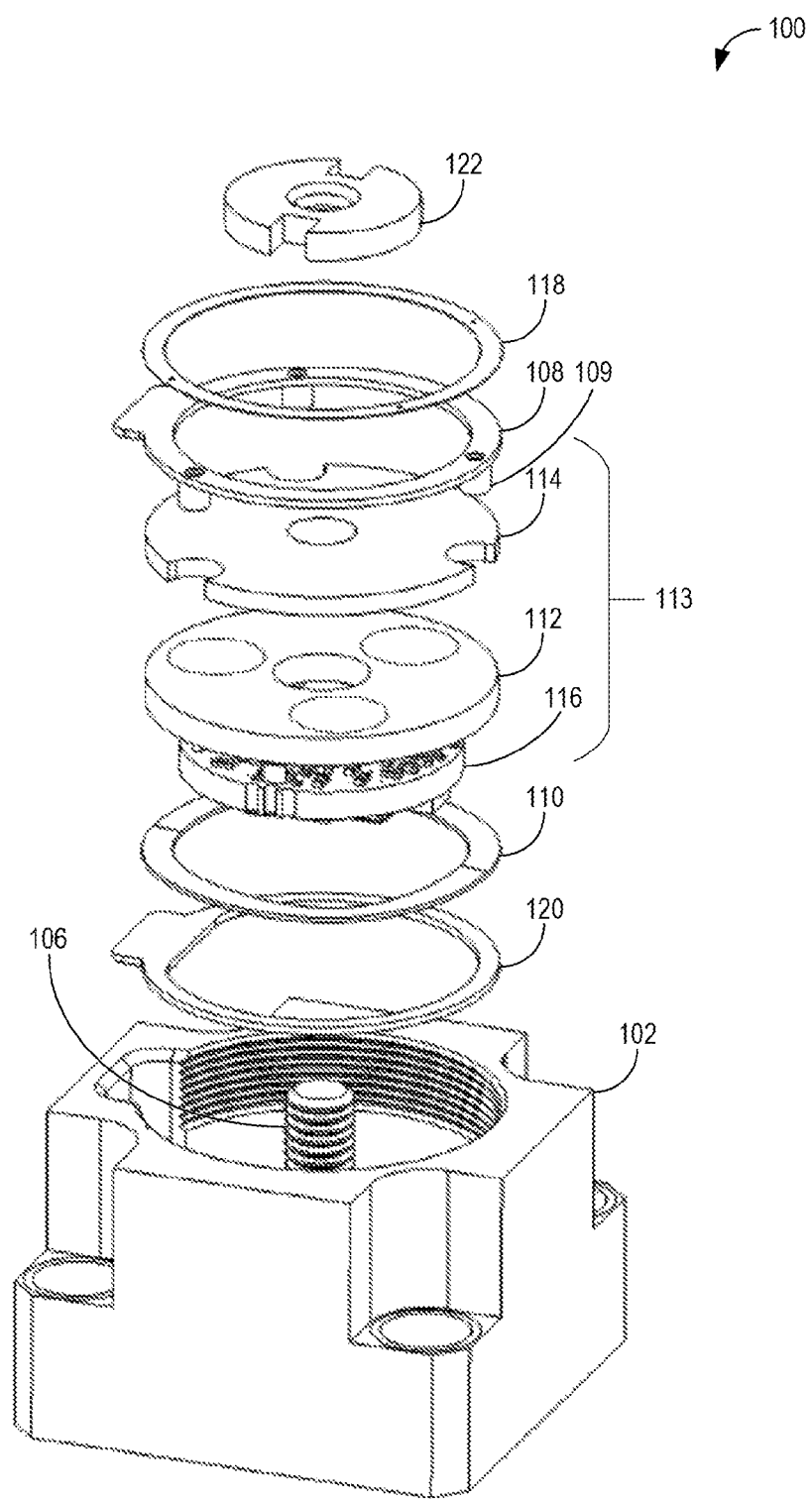
FIG. 1 illustrates an isometric exploded view of a micro-position gap sensor assembly in accordance with a first embodiment of the present disclosure.
Figure 2:
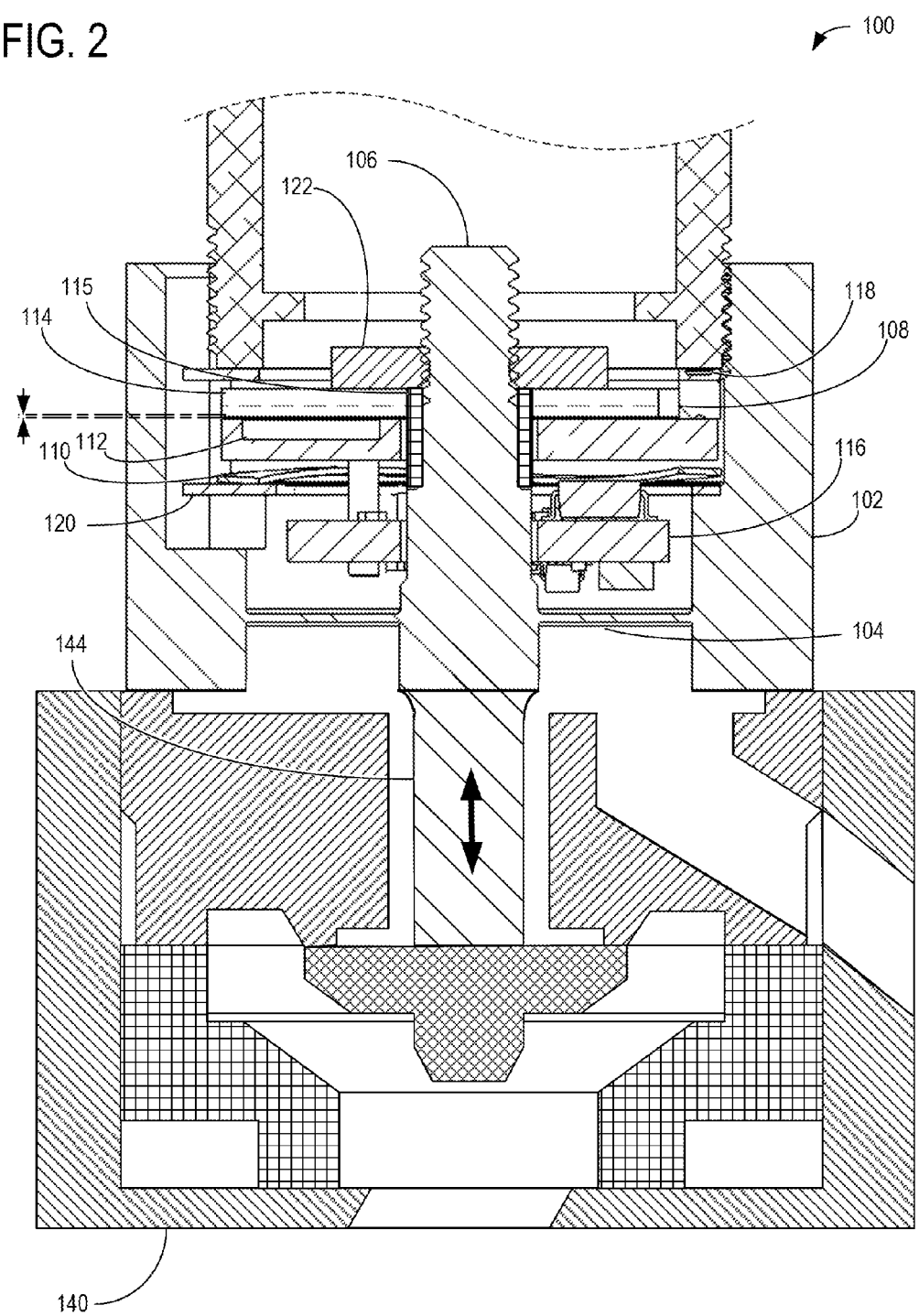
FIG. 2 illustrates a cross sectional view of the micro-position gap sensor assembly of FIG. 1.
Figure 3:
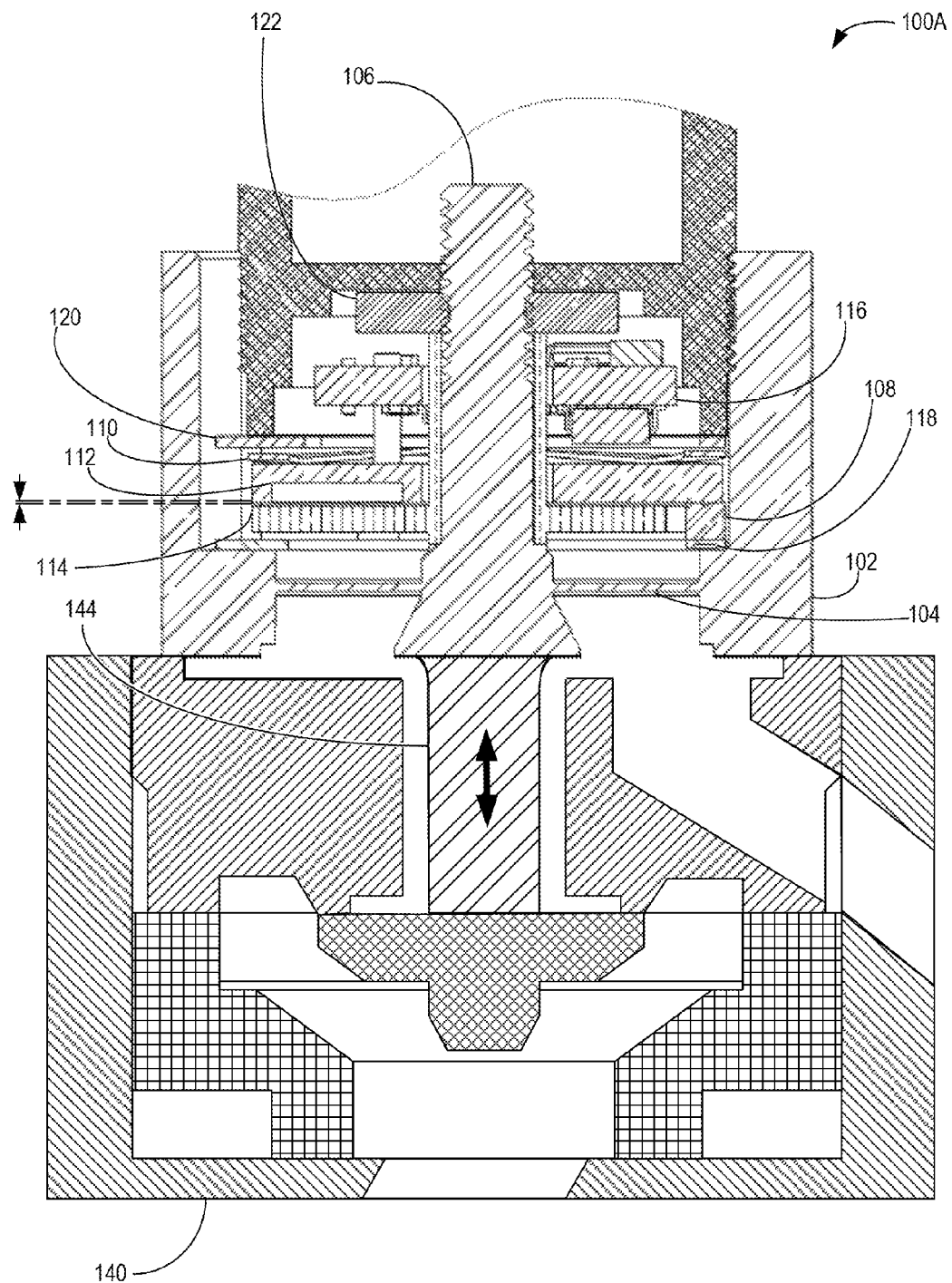
FIG. 3 illustrates a cross sectional view of a micro-position gap sensor assembly in accordance with a second embodiment of the present disclosure.

Disclosed herein is a micro-position gap sensor assembly, a first embodiment of which is illustrated in FIGS. 1-2 at 100, and second embodiment of which is illustrated in FIG. 3. Turning to the first embodiment, the micro-position gap sensor assembly 100 illustrated in FIGS. 1-2 includes a structural housing 102 with a flexible diaphragm 104 fixedly attached at a first end of the structural housing 102.

The structural housing 102 may be configured to house the internal components of micro-position gap sensor assembly 100. The structural housing 102 may be configured to maintain the internal components isolated from exposure to fluids or other elemental factors. Micro-position gap sensor assembly 100 may include a cap at one end to isolate the internal components from non-system environmental factors. Further, structural housing 102 may be constructed of a stainless steel alloy or other suitable material.

The structural housing 102 and flexible diaphragm 104 may collectively form a barrier against fluid ingress into the structural housing. Within structural housing 102, the micro-position gap sensor assembly 100 includes a shaft 106 orthogonally attached to flexible diaphragm 104, a first retainer 108 including one or more standoffs 109, a second retainer 110, and a parallel plate gap sensor between the first retainer 108 and the second retainer 110. The parallel plate gap sensor may be comprised of a non-contact sensor plate 112 biased at a first side against the one or more standoffs of first retainer 108 defining a plane of the non-contact sensor plate 112 and biased at a second side of the non-contact sensor plate 112 against the second retainer 110 and a target plate 114. Target plate 114 may be comprised of a conductive material and may be fixedly attached to the shaft 106 such that a plane of the target plate 114 is parallel to the plane of the non-contact sensor plate 112. The parallel plate gap sensor may also include a printed circuit board 116 coupled to the non-contact sensor plate 112. Printed circuit board 116 may be configured to output a signal indicating a distance between the non-contact sensor plate 112 and the target plate 114.

The configuration of the parallel plate gap sensor may allow small displacements of the shaft 106 within the structural housing 102 to change a distance between the target plate 114 and the non-contact sensor plate 112. This printed circuit board 116 may then output a signal indicating the change in distance. Thus, the configuration of the micro-position gap sensor assembly 100 may provide the advantage of providing a high resolution measurement at the sub-millimeter scale while protecting the sensing components from fluid exposure and/or adversely affecting flow characteristics of the fluid system being measured. Further, the configuration of the micro-position gap sensor assembly 100 may be applicable in many applications including, but not limited to, valve position indication, fluid flow sensing, vibration sensing, prime mover performance, or mechanical defect detection.

FIG. 2 illustrates a cross sectional view of the micro-position gap sensor assembly 100. Flexible diaphragm 104 may be circular, and attached to the structural housing around its entire circumference, forming a fluid-tight seal. Thus, collectively flexible diaphragm 104 and structural housing 102 may form a barrier against fluid ingress into the structural housing. Flexible diaphragm 104 may be formed separately from structural housing 102 and then welded or otherwise secured in place. In other embodiments, flexible diaphragm 104 and structural housing 102 may be formed, e.g., by machining, a single integral unit. Flexible diaphragm 104 may be formed of a flexible alloy or other suitable material. Flexible diaphragm 104 may be configured with a maximum displacement of less than 0.100 millimeters and to provide a resolvable displacement of approximately 0.010 millimeters, in one example.

Returning to FIG. 1, as described above the internal components of micro-position gap sensor assembly 100 may include shaft 106, first retainer 108 including one or more standoffs, second retainer 110, and a parallel plate gap sensor 113 between the first retainer 108 and second retainer 110. The parallel plate gap sensor 113 may comprise a non-contact sensor plate 112, a target plate 114, and a printed circuit board 116 coupled to the non-contact sensor plate 112.

Shaft 106 may be orthogonally attached to the flexible diaphragm. Shaft 106 may extend through a center hole in flexible circuit board 116 and non-contact sensor plate 112. Target plate 114 may be fixedly attached to shaft 106. Shaft 106 may be comprised of a metal alloy with a thermal expansion coefficient matching the material of structural housing 102. In some embodiments, shaft 106 may be threaded allowing target plate 114 to be installed by threading the target plate in place. It will be understood that while the shaft 106 may extend through the center hole within each of non-contact sensor plate 112 and printed circuit board 116, non-contact sensor plate 112 and printed circuit board 116 are not fixedly attached to shaft 106. This configuration allows displacement of shaft 106 and fixedly attached target plate 114 to change the distance between target plate 114 and non-contact sensor plate 112. The cause of the displacement of shaft 106 may be due to the specific application to which micro-position gap sensor assembly 100 is applied.

In a first non-limiting example, shaft 106 may be coupled to a prime mover (not shown) such as a solenoid, piezo-electric actuator, or micro-stepper motor, for use in, for example, a solenoid-actuated or piezo-electrically actuated valve. In this specific application, the actuation of the prime mover of the valve will result in displacement of shaft 106. The resultant change in distance between target plate 114 and non-contact sensor plate 112 may be detected by one or more sensor regions within non-contact sensor plate 112. Printed circuit board 116 may then output a signal indicating the change in distance to a control system for the valve.

In a second non-limiting example, micro-position gap sensor assembly 100 may be applied in a flow sensing circuit. In this example, micro-position gap sensor assembly 100 may be oriented such that flexible diaphragm 104 is facing a fluid or 'wet' side of a fluid flow circuit. Flow of the fluid and/or pressure transients of the fluid within the fluid flow circuit may cause deflections of flexible diaphragm 104. As shaft 106 is orthogonally attached to flexible diaphragm 104, these deflections will result in displacement of shaft 106 within structural housing 102. The changes in the distance between target plate 114 and non-contact sensor plate 112 will be indicated by the signal provided by printed circuit board 116.

Other embodiments may include coupling shaft 106 to a mechanical probe for detection of micro-surface defects in a micrometer type application, or for use in vibration detectors. It will be appreciated that the configuration of micro-position gap sensor assembly 100 may maintain the internal components isolated from the system in which micro-position gap sensor assembly 100 is applied. Thus, the configuration may provide for high resolution, sub-millimeter/sub-micrometer measurements and the generation of a low noise and accurate signal indicating these measurements.

Returning to FIG. 1, non-contact sensor plate 112 may be configured to bias against the one or more standoffs of the first retainer 108. First retainer 108 may be configured as a standoff washer including three or more standoffs configured to bias against the non-contact sensor plate 112. First retainer 108 may be further configured with a key tab. The key tab of first retainer 108 may be configured to fit a slot within an interior wall of structural housing 102 and resist rotational torque applied to the first retainer during assembly of micro-position gap sensor assembly 100. It will be appreciated that first retainer 108 may be configured as a standoff washer. Alternatively, the standoff washer may have fewer than three standoffs, or another suitable retaining structure may be provided configured to bias against non-contact sensor plate 112. First retainer 108 may be aligned within structural housing 102 through the addition of one or more adjustment shims 118. One or more adjustment shims 118 may be added as required during assembly to ensure first retainer 108 is properly oriented such that the one or more standoffs of first retainer 108 may define a plane of non-contact sensor plate 112 within structural housing 102. It will be appreciated that the first retainer 108 may define the plane of the non-contact sensor plate 112 such that it is parallel to the base of structural housing 102. The shims 118 are used to adjust the gap to a desired level, by inserting one or more shims 118 of appropriate thickness to adjust the gap to a desired distance.

Non-contact sensor plate 112 may also bias against second retainer 110 at a second side of non-contact sensor plate 112. It will be appreciated that first retainer 108 and second retainer 110 bias non-contact sensor plate 112 on opposite sides to prevent motion of non-contact sensor plate within structural housing 102. Second retainer 110 may include a wave washer, which may have, for example, three or more wave peaks configured to bias against the non-contact sensor plate at each wave peak. Alternatively, another number of wave peaks may be used. It will be appreciated that second retainer 110 may also include wave washers with fewer than three wave peaks or any other suitable retainer configured to bias against non-contact sensor plate 112. A wave compression spring ring 120 may be configured to bias against second retainer 110 and structural housing 102.

Shaft 106, first retainer 108, and second retainer 110 may be comprised of paramagnetic materials with similar thermal expansion coefficients as the material comprising structural housing 102. Thus, first retainer 108 and second retainer 110 may maintain the planar orientation, prevent vertical motion of the non-contact sensor plate 112 within structural housing 102, and may prevent changes to the distance between target plate 114 and non-contact sensor plate 112 due to thermal expansion or contraction of micro-position gap sensor assembly 100.

Non-contact sensor plate 112 may include one or more sensing regions within non-contact sensor plate 112. Each sensing region may include a sensing coil configured to operate as a capacitance, magnetic field sensing, eddy current, or any other suitable sensor configured to sense a distance between non-contact sensor plate 112 and target plate 114. Each sensing region may be electrically connected to printed circuit board 116. In some embodiments, the non-contact sensor plate may include one or more sensing sensor regions within a high strength alloy or ceramic plate. In these embodiments, non-contact sensor plate may resist plastic deformation due to compression forces applied during assembly and operation of the micro-position gap sensor assembly.

Target plate 114 may be comprised of a conductive and paramagnetic material and fixedly attached to shaft 106, with or without a high-strength support member bonded to it. Target plate 114 may be oriented such that a plane of target plate 114 is parallel to the plane of non-contact sensor plate 112. Further, target plate 114 may be oriented such that a small distance or gap (indicated by the dashed lines and arrows in FIGS. 2 and 3) is maintained between target plate 114 and non-contact sensor plate 112. This configuration allows any displacement of the shaft 106 within structural housing 102 to change the distance between target plate 114 and non-contact sensor plate 112. This change in distance may be detected by sensing regions within the non-contact sensor plate 112.

Target plate 114 may be configured to be threaded, glued, or fixedly attached by any other suitable fixed connection onto shaft 106. Further, target plate 114 may include a non-conductive sleeve 115 to electrically isolate the conductive material of target plate 114 from shaft 106. Non-conductive sleeve 115 may be comprised of ceramic, hardened tool steel, or any other suitable non-conductive material with a material hardness greater than that of the conductive material of target plate 114. The conductive material of target plate 114 may be bonded to non-conductive sleeve 115 by press fitting, welds, brazing, or any other suitable bonding process. Target plate 114 may be further configured to accommodate passage of the one or more standoffs of first retainer 108 through or around target plate 114 and to non-contact sensor plate 112 as illustrated in FIG. 1.

In some embodiments, target plate 114 may be bonded to a high strength alloy or ceramic plate to reduce the possibility of plastic deformation due to compression forces applied during assembly and operation of the micro-position gap sensor assembly.

Printed circuit board 116 may be coupled to non-contact sensor plate 112. In some embodiments, printed circuit board 116 may be physically and electrically coupled to non-contact sensor plate 112 forming a single assembly. In other embodiments, printed circuit board 116 may only be electrically coupled to non-contact sensor plate 112, thus allowing printed circuit board 116 to be alternatively located within structural housing 102 (as illustrated in FIGS. 2 and 3).

Printed circuit board 116 may be configured to output a signal indicating the distance between the non-contact sensor plate 112 and target plate 114. The signal may be output via wiring, optical cables, or any suitable means to a control system or other indication system. Printed circuit board 116 may include an oscillation circuit. Printed circuit board 116 may also include a temperature sensor or temperature IC to compensate for local temperature for electronic temperature correction of output signal due to temperature drift of circuit components. It will be appreciated that printed circuit board 116 may include analog to digital conversion circuits to increase the quality of the output signal. It will be further appreciated that the oscillation circuit within printed circuit board 116 may be electromagnetically shielded by the material of the structural housing 102, thus interference from external electromagnetic sources may be minimized.

Micro-position gap sensor assembly may also include a jam retainer 122 configured to fixedly attach to the shaft. Jam retainer 122 may include a retaining nut or spring clip configured to secure target plate 114 to shaft 106.

A compression force may be applied to first retainer 108 by a valve housing or an upper housing or cap of structural housing 102. This compression force may be transmitted to non-contact sensor plate 112 through the one or more standoffs of first retainer 108.

FIG. 2 illustrates a cross sectional view of the of micro-position gap sensor assembly 100 of the first embodiment. In this first embodiment, the internal components of micro-position gap sensor assembly 100 may be oriented and function as follows. In this embodiment, structural housing 102, flexible diaphragm 104, shaft 106 are oriented such that shaft 106 is vertical and centered within the structural housing 102. Wave compression spring ring 120 is oriented within structural housing 102 such that it bears on an internal ledge within structural housing 102. A key tab on wave compression spring ring 120 may fit a slot within an interior wall of structural housing 102 to resist rotational torque forces that may be imparted to the internal components of micro-position gap sensor assembly 100 during assembly.

Second retainer 110 may be oriented to bias against the wave compression spring ring 120 such that a force from wave compression spring ring 120 may be transmitted upward to non-contact sensor plate 112.

Non-contact sensor plate 112 may be coupled to printed circuit board 116 and may be oriented within structural housing such that shaft 106 passes through the center hole of each. Further, non-contact sensor plate 112 may be oriented such that the non-contact sensor plate 112 is biased against second retainer 110 below. In this configuration, wave compression spring ring 120 may push upward against second retainer 110 which transmits the force to non-contact sensor plate 112.

Target plate 114 may be fixedly attached to shaft 106 such that a gap (indicated by the dashed lines and arrows) exists between target plate 114 and non-contact sensor plate 112. Target plate 114 is further oriented in a planar orientation that is parallel to the plane of non-contact sensor plate 112. Target plate 114 may be configured to travel with displacement of shaft 106 such that a distance between target plate 114 and non-contact sensor plate may range from 50 micrometers to 200 micrometers and such that target plate 114 may not physically contact non-contact sensor plate 112.

The one or more standoffs of first retainer 108 may extend downward to bias against and define the plane of non-contact sensor plate 112. The standoffs may project downward around target plate 114 or through openings in the target plate 114 as illustrated. First retainer 108 may be aligned within structural housing 102 by a key tab similar to wave compression spring ring 120. Optionally, one or more adjustment shims 118 may be placed above first retainer to ensure the plane of first retainer 108 is perpendicular to the centerline axis of shaft 106. This configuration may ensure that the non-contact sensor plate 112 is maintained parallel to target plate 114. As discussed above, the opposing upward and downward forces applied by second retainer 110 and first retainer 108 may maintain the orientation of non-contact sensor plate 112 during thermal expansion and contraction of structural housing 102 and/or shaft 106. Furthermore, the opposing forces may prevent changes in the distance between target plate 114 and non-contact sensor plate 112 due to thermal expansion or contraction thereby limiting thermal effect associated error in the output signal.

For example, as target plate 114 is fixedly attached to shaft 106, thermal expansion or contraction of shaft 106 may cause a change in the distance between target plate 114 and non-contact sensor plate 112. However, the opposing biasing forces from first retainer 108 and second retainer 112 may thermally balance parallel plate gap sensor 113 to offset the thermal expansion of shaft 106. Upon thermal expansion of shaft 106, the biasing force from second retainer 110 may cause non-contact sensor plate 112 to move toward target plate 112, thereby offsetting any increase of the distance between non-contact sensor plate 112 and target plate 114. It will be appreciated that to maintain the gap in the parallel plate gap sensor 113 one of first retainer 108 and second retainer 110 is configured with elastic properties that bias one of the plates and the other of first retainer 108 and second retainer 110 is fixedly coupled to the shaft and configured to cause the other of the plates to move with the shaft.

The downward force exerted upon non-contact sensor plate 112 from the one or more standoffs of first retainer 108 may originate from a compression force applied by the valve housing. As discussed above, valve housing may apply a compressive force downward on the internal components of micro-position gap sensor assembly 100. In this configuration, the downward compressive force upon non-contact sensor plate 112 may be opposed by an upward force from compression spring ring 120. This opposing force configuration allows non-contact sensor plate 112 to float within structural housing 102 while maintaining a substantially horizontal (parallel to flexible diaphragm 104 and orthogonal to shaft 106) planar orientation.

Micro-position gap sensor assembly 100 may be coupled to a flow control valve 140 as illustrated. Displacement of shaft 106, by a prime mover (not shown) coupled to shaft 106, for example, may effect displacement of valve shaft 144. Displacement of valve shaft 144 may change a position of the valve body part relative to a valve seat of the flow control valve. The change in position of the valve body part may effect a change in the rate of fluid flow through flow control valve 140. Flow control valve 140 is illustrated as having a normally closed configuration, in which the valve body part is biased against a spring holding the valve body part biased against the valve seat preventing fluid flow through flow control valve 140. A displacement of shaft 106 away from the valve seat may move the valve body part away from the valve seat creating a path for fluid flow through flow control valve 140.

It will be appreciated that alternative configurations of flow control valve 140 may be employed. For example, a normally open configuration flow control valve 140 may be coupled to micro-position gap sensor assembly 100. In this alternative configuration, the valve body part may be biased against a spring preventing the valve body part from biasing against the valve seat. Therefore, shaft 106 may be displaced toward the valve seat overcoming the spring force to bias the valve body part against the valve seat closing the fluid flow path through flow control valve 140.

As discussed above the displacement of shaft 106 may change the distance between non-contact sensor plate 112 and target plate 114. Printed circuit board 116 may provide a signal indicating the distance between non-contact sensor plate 112 and target plate 114 to a flow control system. Therefore, micro-position gap sensor assembly 100 may indicate a position of flow control valve 140 to the flow control system. The flow control system may calculate an accurate flow rate of fluid through flow control valve 140 from the fluid pressure of the system, thereby enabling accurate control of fluid flow within the system and rapid adjustment of the fluid flow. In other words, the flow control valve position measured by micro-position gap sensor assembly 100 may be employed in a valve-position feedback control method.

Although in the first embodiment target plate 114 is fixedly coupled to the shaft 106 and located above non-contact sensor plate 112 that is biased upward, it will be appreciated that the positions of the target plate 114 and non-contact sensor plate 112 may be switched in this embodiment, such that the target plate 114 is located below the non-contact sensor 112 and biased upward, while the non-contact sensor 112 is located above the target plate 114 and fixedly coupled to the shaft 106.

FIG. 3 illustrates a cross sectional view of the of micro-position gap sensor assembly 100A in a second embodiment. In this second embodiment, the internal components of micro-position gap sensor assembly 100A may be ordered and function as follows. Structural housing 102, flexible diaphragm 104, shaft 106 are oriented such that shaft 106 is vertical and centered within the structural housing 102. However, unlike the first embodiment, adjustment shims 118 may bear upon the internal ledge within structural housing 102. First retainer 108 may then be configured with the one or more standoffs extending upward and around target plate 114. Target plate 114 may be fixedly attached to shaft 106 as described above for the first embodiment. However, it will be recognized that in this second embodiment, target plate 114 is illustrated with a sleeve electrically isolating the conductive paramagnetic regions of target plate 114 from shaft 106. The sleeve may be comprised of ceramic or other non-conductive material. Non-contact sensor plate 112 may then bias against the upward facing one or more standoffs of first retainer 108. As in the first embodiment, printed circuit board 116 may be physically and electrically coupled to non-contact sensor plate 112. The second retainer may then be positioned between non-contact sensor plate 112 and wave compression spring ring 120. In this configuration, wave compression spring ring 120 may be compressed by a cap threaded into structural housing 102 as illustrated. Jam retainer 122 may then be fixedly attached to shaft 106.

Although in the second embodiment target plate 114 is fixedly coupled to shaft 106 and located below non-contact sensor plate 112 that is biased downward, it will be appreciated that the positions of the target plate 114 and non-contact sensor plate 112 may be switched in this embodiment, such that the target plate 114 is located above the non-contact sensor 112 and biased downward, while the non-contact sensor 112 is located below the target plate 114 and fixedly coupled to the shaft 106.

As discussed above with reference to FIG. 2, micro-position gap sensor assembly 100A may be coupled to flow control valve 140.

Figure 4:
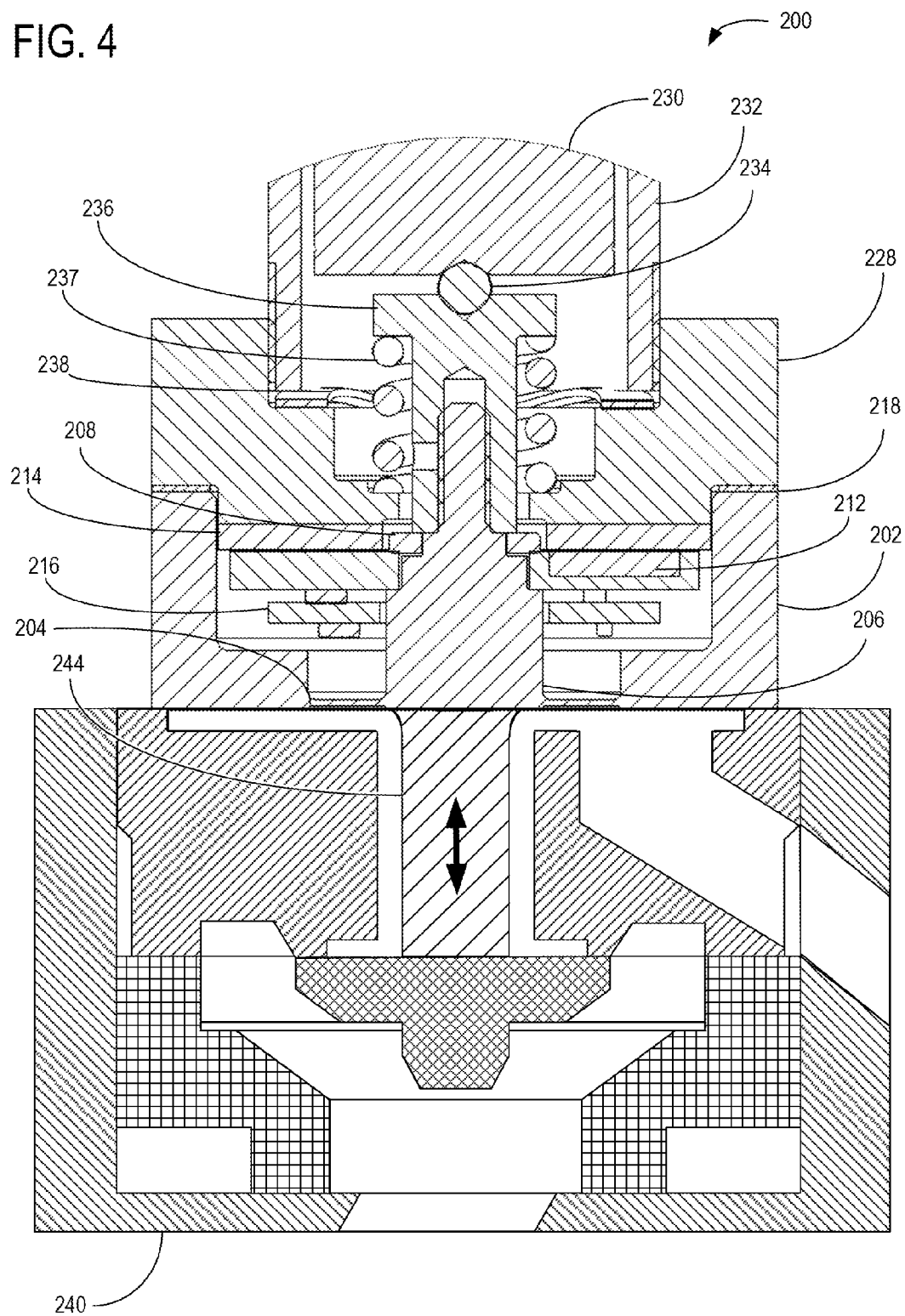
FIG. 4 illustrates a cross sectional view of a micro-position gap sensor assembly in accordance with a third embodiment of the present disclosure.
Figure 5:
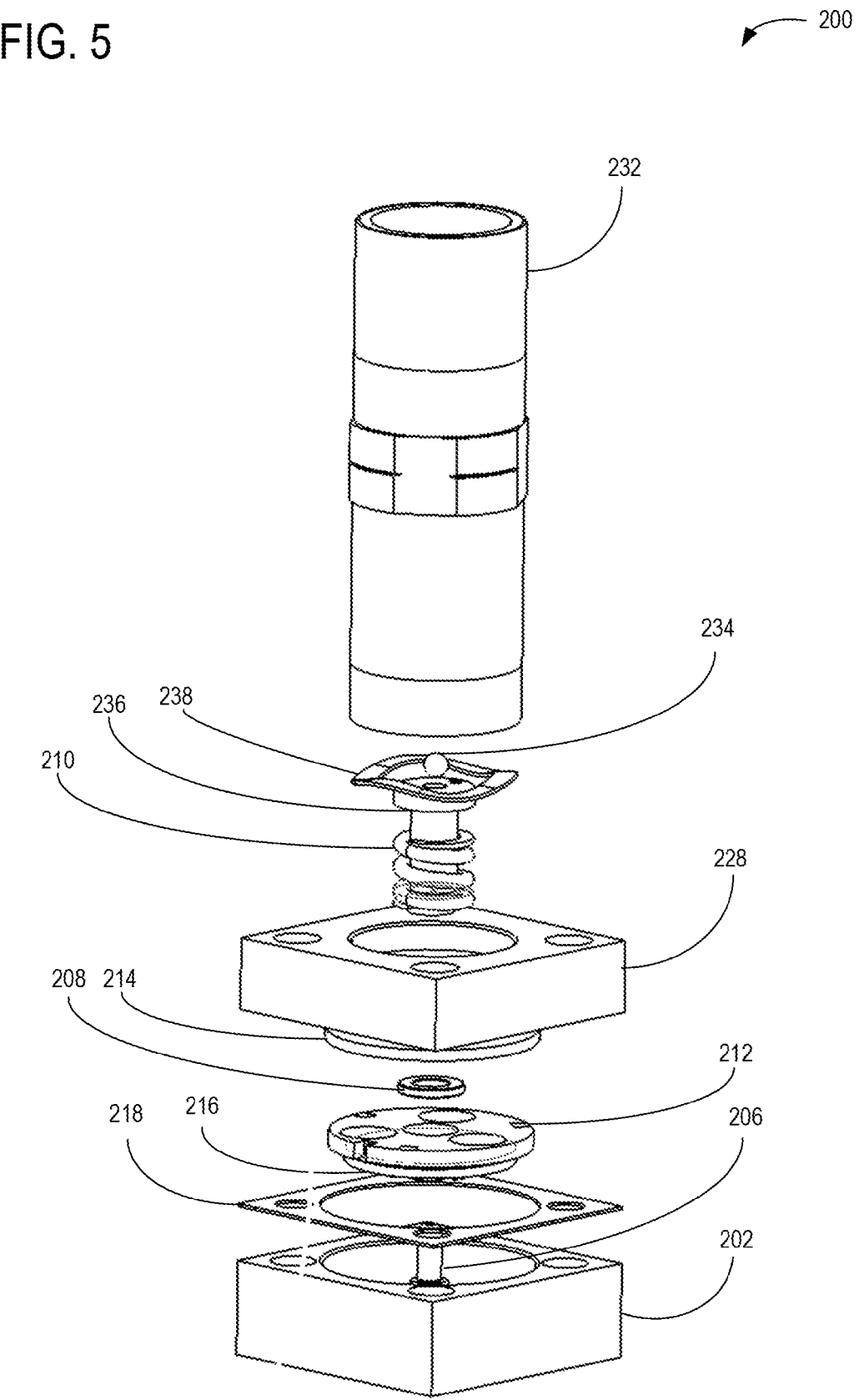
FIG. 5 illustrates an isometric exploded view of the micro-position gap sensor assembly of FIG. 4.

FIGS. 4 and 5 illustrate a third embodiment of micro-position gap sensor assembly 200. FIG. 4 illustrates a cross sectional view of a third embodiment of micro-position gap sensor assembly 200 coupled to a prime mover or actuator and a flow control valve 240. An isometric exploded view of micro-position gap sensor assembly 200 is illustrated in FIG. 5. A prime mover housing 232 may be coupled to micro-position gap sensor assembly 200 housing a prime mover or actuator element 230, bearing 234, actuator return spring compression member 236, an actuator return spring 237, and, optionally, a locking spring for prime mover housing 232. Prime mover housing 232 may optionally be secured in place by a prime mover housing locking ring 238.

Micro-position gap sensor assembly 200 may be configured such that a prime mover or actuator element 230 is coupled to a bearing 234. Bearing 234 may mechanically couple prime mover or actuator element 230 to actuator return spring compression member 236. The mechanical coupling of bearing 234 to actuator return spring compression member 236 may be configured such that prime mover or actuator element 230 may effect a change in the valve position of flow control valve 240.

Actuator return spring compression member 236 may provide a compressive force against actuator return spring 237. Further, actuator return spring compression member 236 may bias against first retainer 208 providing a compressive force against first retainer 208. Actuator return spring compression member 236 may be coupled to shaft 206. In this configuration, actuator return spring 237 may apply a force against actuator return spring compression member 236 such that upon disengagement of prime mover or actuator element 230, the force from actuator return spring 237 may act to reverse the change in valve position of flow control valve 240.

The structural housing of micro-position gap sensor 200 may include a top body piece 228 and a bottom body piece 202. Top body piece 228 may be installed by threading, press fitting or any other suitable method into bottom body piece 202. As described above, the structural housing of micro-position gap sensor assembly 200 may include flexible diaphragm 204. Flexible diaphragm 204 may be fixedly attached or cast as a single piece with bottom body piece 202.

Micro-position gap sensor assembly 200 may include a parallel plate gap sensor supported at a first side by the first retainer 208 and the step of shaft 206 and supported at a second side by the structural housing. The parallel plate gap sensor may comprise a non-contact sensor plate 212, a target plate 214, and a printed circuit board 216 coupled to the non-contact sensor plate. Printed circuit board 216 may be configured to output a signal indicating a distance between non-contact sensor plate 212 and target plate 214.

Micro-position gap sensor assembly 200 may include a shaft 206 configured with one or more diameters. Shaft 206 may be configured with a first larger diameter and at least one smaller diameter. The first larger diameter of shaft 206 may step inward to each smaller diameter forming a step on shaft 206.

In some embodiments, target plate 214 may be bonded to a bottom side of top body piece 228. As discussed above, target plate 214 may include conductive, paramagnetic material. Target plate 214 may be bonded to top body piece 228 by press fitting, welds, brazing or any other suitable bonding method.

Actuator return compression member 236 may apply a downward compressive force on a first retainer 208. In this embodiment, first retainer 208 may be any of a sensor compression collet, chuck, or any other suitable retainer. A portion of first retainer 208 may bias against a top side of non-contact sensor plate 212.

Non-contact sensor plate 212 may be fixedly attached to shaft 206 such that a plane of non-contact sensor plate 212 is parallel to a plane of target plate 214 and such that small displacements of shaft 206 may move non-contact sensor plate 212, changing the distance between target plate 214 and non-contact sensor plate 212. The distance between non-contact sensor plate 212 and target plate 214 may be established through the use of one or more gap adjustment shims 218 of varying thickness placed between top body piece 228 and bottom body piece 202 of the structural housing.

It will be appreciated that in some configurations, the upward biasing force may comprise a reaction force equal in magnitude and in opposition to the downward compression force applied by actuator return spring compression member 236 through first retainer 208.

As shown in FIG. 4, shaft 206 may include a step or step. In this configuration, non-contact sensor plate 212 may bear on the step on shaft 206 such that the step on shaft 206 may exert an upward force against a bottom surface of non-contact sensor plate 212. Therefore, non-contact sensor plate 212 may bias at a first side against a portion of first retainer 208 and receive a biasing force in opposition to first retainer 208.

Micro-position gap sensor assembly 200 may include a printed circuit board 216. Printed circuit board 216 may be electrically and/or physically coupled to non-contact sensor plate 212 and output a signal proportional to a distance between non-contact sensor plate 212 and target plate 214 as described in the first and second embodiments above.

Shaft 206 may be coupled to valve shaft 244 of flow control valve 240 such that a displacement of prime mover or actuator element 230 may effect a displacement of valve shaft 244 and valve disk 242 relative to the seat of flow control valve 240.

Figure 6:
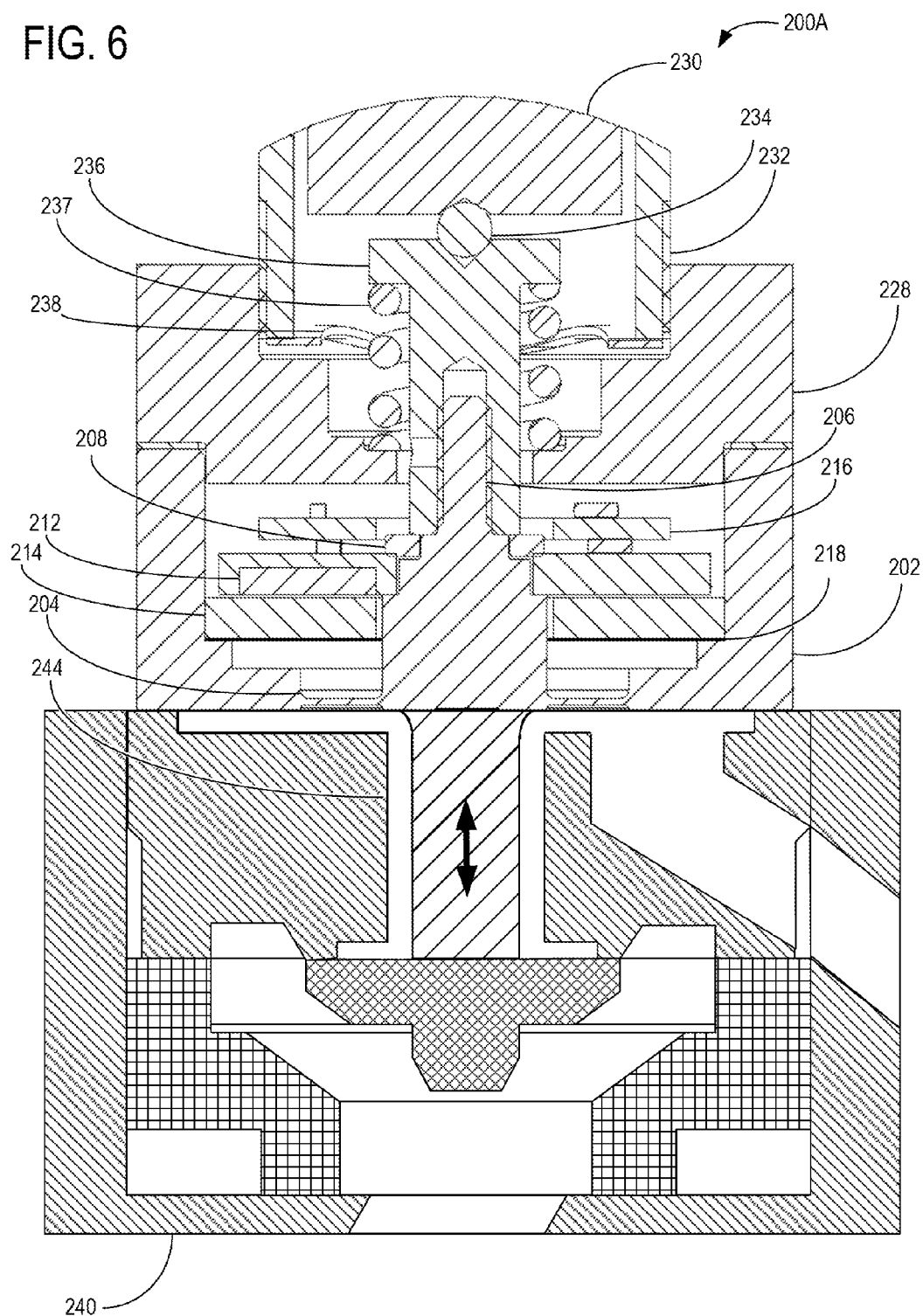
FIG. 6 illustrates a cross sectional view of a micro-position gap sensor assembly in accordance with a fourth embodiment of the present disclosure.
Figure 7:
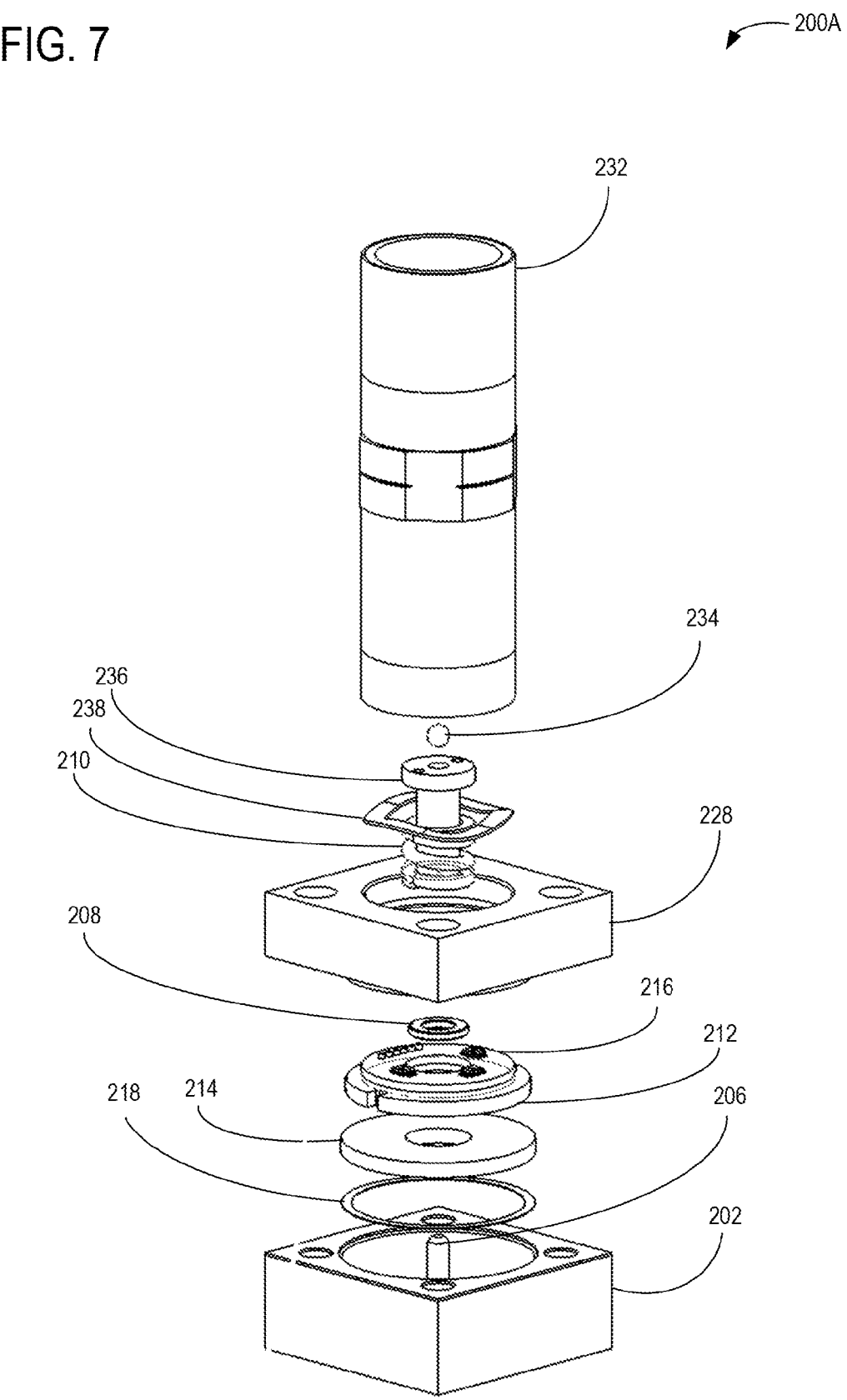
FIG. 7 illustrates an isometric exploded view of the micro-position gap sensor assembly of FIG. 6.

FIGS. 6 and 7 illustrate a fourth embodiment, a reverse configuration of the micro-position gap sensor assembly 200 of FIGS. 4 and 5. FIG. 6 illustrates a cross-sectional view of micro-position gap sensor assembly 200A coupled to a prime mover or actuator and a flow control valve 240. FIG. 7 provides an isometric exploded view of micro-position gap sensor assembly 200A. For the sake of brevity, only the differences between micro-position gap sensor assembly 200A of FIGS. 6 and 7 and micro-position gap sensor assembly 200 of FIGS. 4 and 5 will be discussed.

In the reverse configuration target plate 214 may be located in bottom body part 202. One or more gap adjustment shims may be located between bottom body part 202 and target plate 214 to establish the distance between target plate 214 and non-contact sensor plate 212. As discussed above with reference to FIGS. 4 and 5, non-contact sensor plate 212 may be biased against a portion of first retainer 208 and the biasing force in opposition of first retainer 208 may be applied by a step on shaft 206. Further, printed circuit board 216 may be located on a side of non-contact sensor plate 212 opposite target plate 214.

It will be appreciated that although micro-position gap sensor assemblies 200 and 200A have been illustrated with a bearing 234 coupling prime mover or actuator element 230 to actuator return spring compression member 236, any suitable coupling may be used to transmit force from prime mover of actuator element 230 to actuator return spring compression member 236. It will be further appreciated that the type of coupling may be specific to the installed prime mover.

Figure 8:
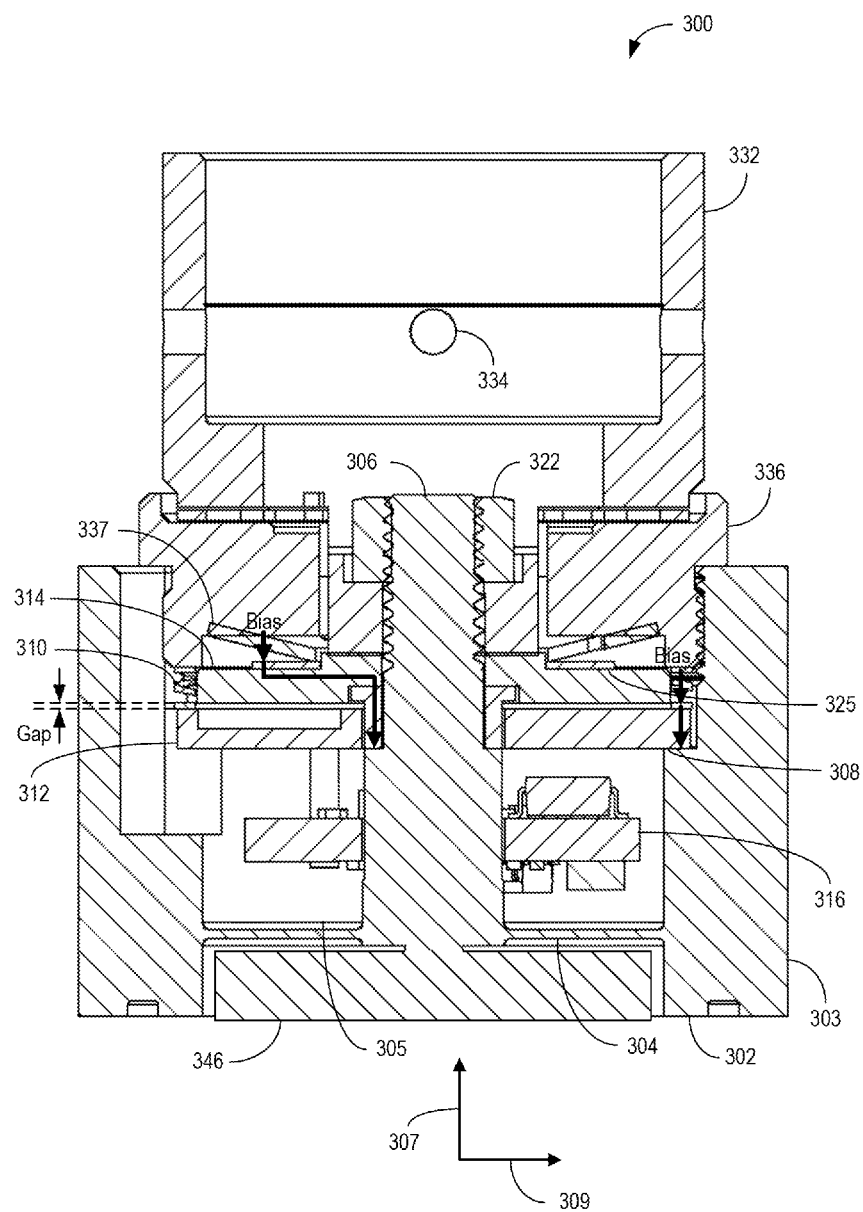
FIG. 8 illustrates a cross sectional view of a micro-position gap sensor assembly in accordance with a fifth embodiment of the present disclosure.
Figure 9:
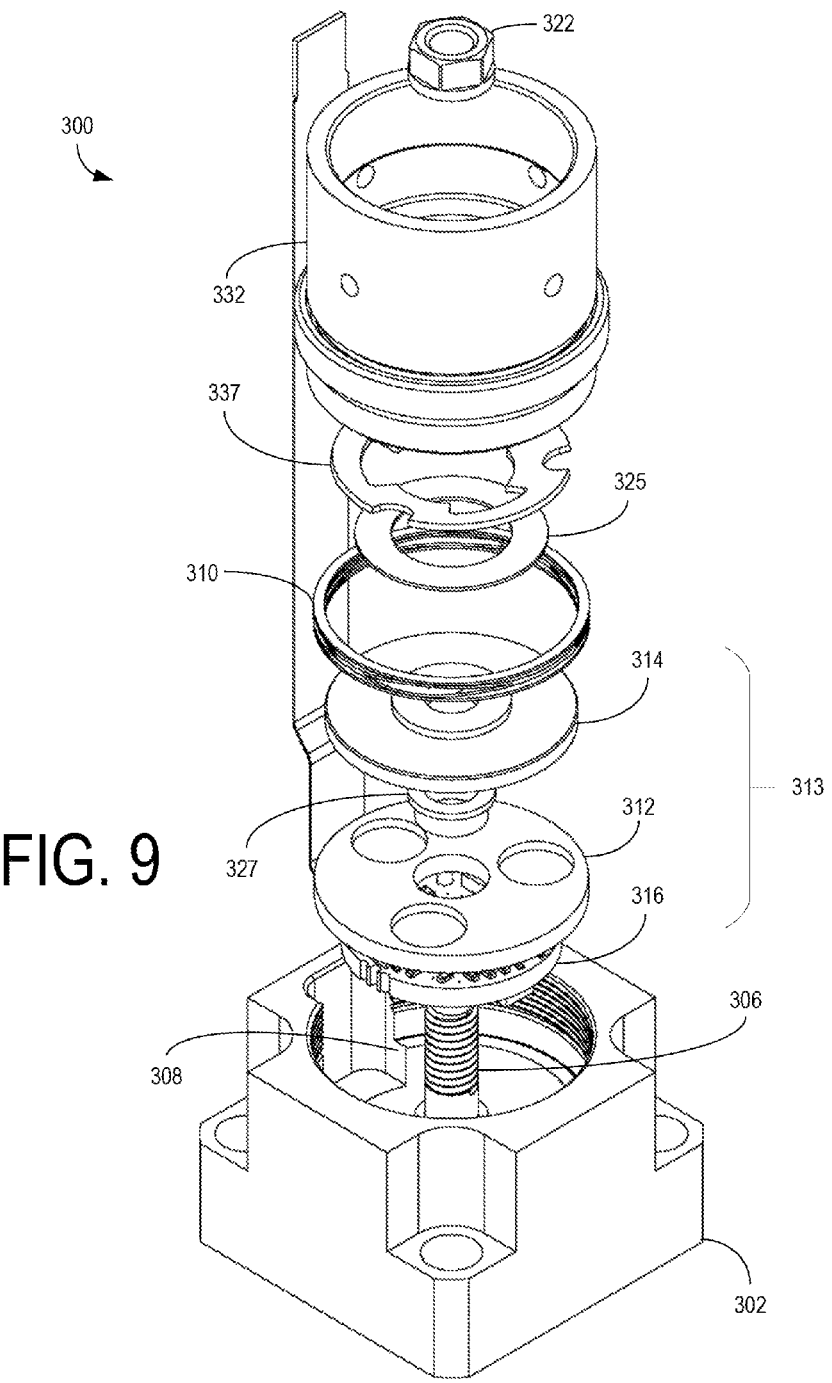
FIG. 9 illustrates an isometric exploded view of the micro-position gap sensor assembly of FIG. 8.
Figure 10:
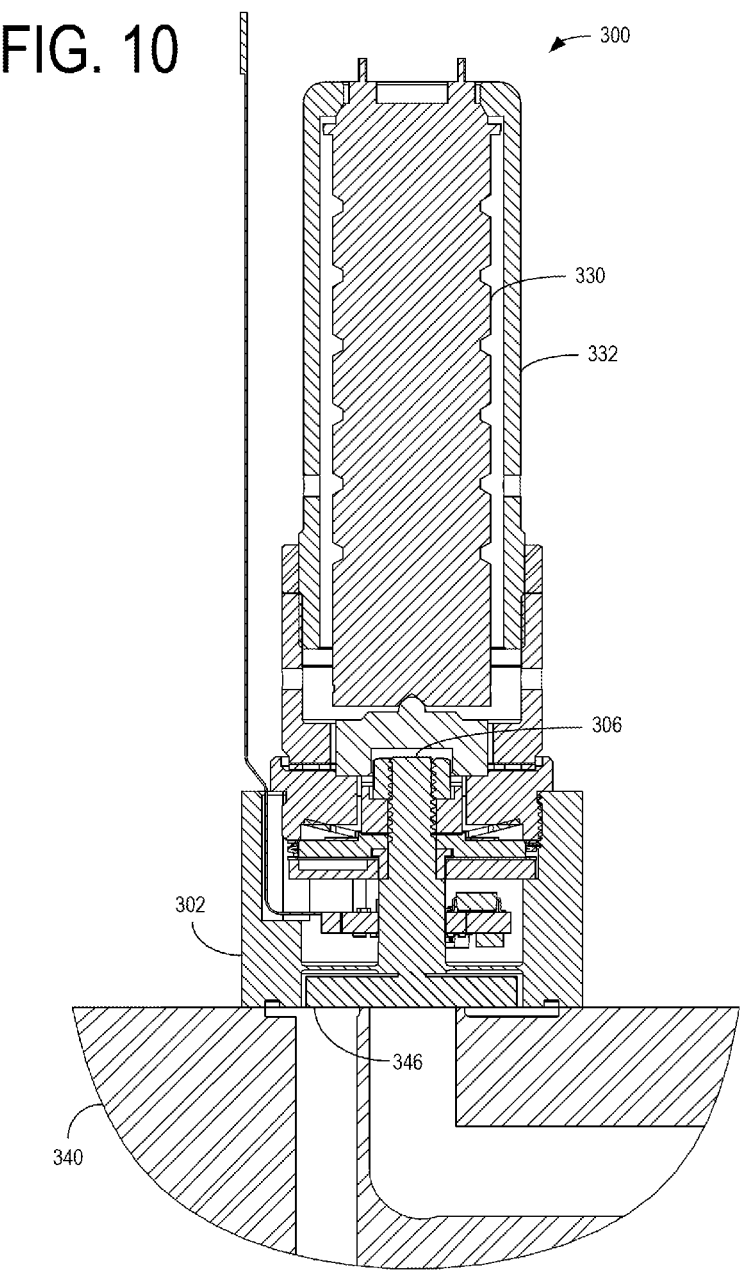
FIG. 10 illustrates a cross sectional view of the micro-position gap sensor assembly of FIG. 8, including a flow control valve.

FIGS. 8-10 illustrate a fifth embodiment of micro-position gap sensor assembly 300. FIG. 8 illustrates a cross sectional view of the fifth embodiment of micro-position gap sensor assembly 300 including a structural housing 302. The structural housing 302 may be configured to house the internal components of micro-position gap sensor assembly 300, and may have a sidewall 303 at least partially surrounding a central region 305. An isometric exploded view of micro-position gap sensor assembly 300 is illustrated in FIG. 9. FIG. 10 illustrates a cross sectional view of the fifth embodiment of micro-position gap sensor assembly 300 including a flow control valve 340.

A cross sectional view of micro-position gap sensor assembly 300 is shown in FIG. 8. The micro-position gap sensor assembly 300 may include a prime mover housing 332 that houses a prime mover or actuator element 330, a bearing 334, a spring compression member 336, a spring 337, and, optionally, a locking spring for prime mover housing 332. Micro-position gap sensor assembly 300 may further include a flexible diaphragm 304 fixedly attached at a first end of the structural housing 302 and forming a barrier against fluid ingress into the central region 305 of the structural housing 302. Within structural housing 302, a shaft 306 may be orthogonally attached to the flexible diaphragm 304. The shaft 306 may extend in an orthogonal direction 307 to a surface of the flexible diaphragm 304 through the central region 305 of the structural housing 302 towards a second end of the structural housing 302 opposite the first end.

Micro-position gap sensor assembly 300 may be configured such that the prime mover or actuator element 330 is coupled to the bearing 334. Bearing 334 may mechanically couple prime mover or actuator element 330 to spring compression member 336. Spring compression member 336 may be formed as a step of the structural housing 302 (in the illustrated embodiment, spring compression member 336 is threadedly fastened with the structural housing 302), and may provide a compressive force against spring 337. The step may be created by a step down in thickness of the sidewall 303, which may be thicker on a side of the step toward the first end than on a side of the step toward the second end. A first portion of the spring compression member 336 may contact and restrict movement of a first side of the spring 337.

Micro-position gap sensor assembly 300 may further include a first retainer 308 and a second retainer 310. The first retainer 308 may be formed as an inwardly extending step in the sidewall 303 of the central region 305 of the structural housing 302. The second retainer 310 may include a compression spring, which may be a wave washer or any other suitable retainer configured to bias against non-contact sensor plate 312. One end of the second retainer 310 may be secured against movement in the orthogonal direction 307 by a second portion of the spring compression member 336. The first retainer 308 and second retainer 310 may be configured to hold a plate gap sensor 313 in place relative to the structural housing 302. The plate gap sensor 313 may include a non-contact sensor plate 312 and a target plate 314 positioned adjacent the non-contact sensor plate 312 and separated therefrom by a gap, indicated in FIG. 8 by dashed lines and arrows. The target plate 314 may be formed of a conductive and paramagnetic material.

Figure 11:
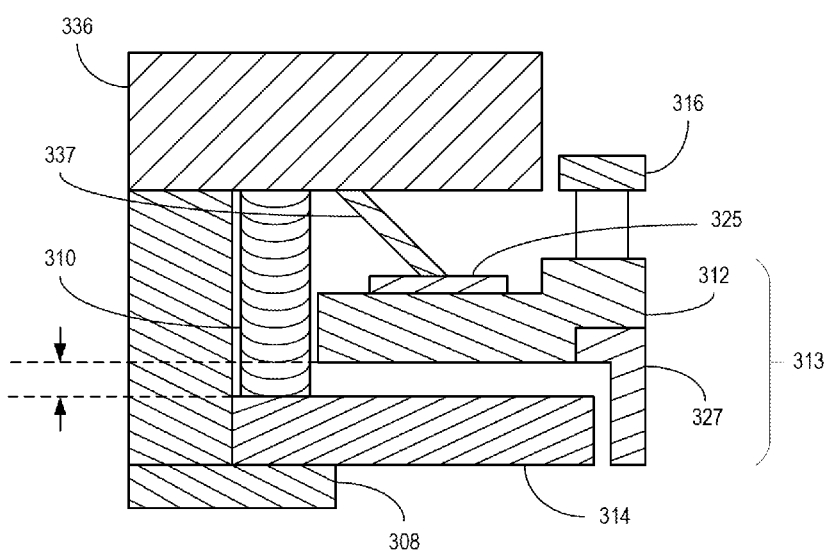
FIG. 11 shows a schematic depiction of a parallel plate gap sensor in accordance with a sixth embodiment of the present disclosure.

One of the target plate 314 and non-contact sensor plate 312 may be configured to follow the movement of the shaft 306. The other of the target plate 314 and non-contact sensor plate 312 may be retained by a biasing force of the second retainer 310, by being biased against the first retainer 308. As shown in FIG. 9, the non-contact sensor plate 312 may have a first central opening through which the shaft 306 passes. Additionally or alternatively, the target plate 314 may have a second central opening through which the shaft 306 passes. Displacement of the one of the target plate 314 and non-contact sensor plate 312 that follows the movement of the shaft 306, caused by movement of the shaft 306, may change a distance between the target plate 314 and the non-contact sensor plate 312. As shown in FIG. 8, the target plate 314 is configured to follow the movement of the shaft 306, and the non-contact sensor plate 312 is configured to be retained by the biasing force of the second retainer 310 by being biased against the first retainer 308 and thereby fixed in position relative to the structural housing 302. Displacement of the target plate 314 caused by movement of the shaft 306 may change a distance between the target plate 314 and the non-contact sensor plate 312. An alternative embodiment in which the non-contact sensor plate 312 is configured to follow the movement of the shaft 306 and the target plate 314 is configured to be retained by the biasing force of the second retainer 310 is shown in FIG. 11. In an alternative embodiment, the first retainer 308 may be configured as the step of the spring compression member 336, and the second retainer 310 may be configured to bias the non-contact sensor plate 312 against the spring compression member 336. In this case, the spring compression member 336 can be defined as a part of the structural housing 303.

In the embodiment of FIG. 8, the non-contact sensor plate 312 may be biased by the biasing force from the second retainer 310 received at a first side of the non-contact sensor plate 312 and biasing the non-contact sensor plate 312 so that a second side of the non-contact sensor plate 312 is held against a portion of the first retainer 308. The second retainer 310 may be a wave washer including three or more wave peaks configured to bias against the non-contact sensor plate 312. The target plate 314 may receive a second biasing force from a spring 337 received at a first side of the target plate 314 and biasing the target plate 314 so that a second side of the target plate 314 is held against a portion of the first retainer 308 or a retaining structure that is coupled to the shaft 306. In addition, a bearing washer 325 may be located between the target plate 314 and the spring 337 to protect the target plate 314 from damage that may occur from direct contact between the target plate 314 and the spring 337. The first retainer 308 and second retainer 310 may be configured to maintain the gap between the non-contact sensor plate 312 and the target plate 314 and prevent the non-contact sensor plate 312 from coming into contact with the target plate 314. In addition, a component of the force exerted by the spring 337 may bias against the target plate 337 in a radial direction 309, as well as in the axial direction 307, in order to prevent radial movement of the target plate 314. It will be appreciated that the target plate 314 may fit with a slight clearance around shaft 306, and due to this clearance the target plate 314 may move slightly radially as well, if not held by a biasing force. Preventing radial movement of the target plate 314 may prevent change in position of the target plate 314 that may negatively affect the accuracy of the distance measured by the micro-position plate gap sensor assembly 300. Because the target plate 314 may not be securely affixed to the shaft 306, the target plate 314 may not be subjected to stress from the shaft 306. Therefore, by biasing against the target plate 314 in a radial direction, the spring 337 may prevent the target plate 314 from undergoing strain that may negatively affect accuracy of distance measurements made by the micro-position gap sensor assembly 300. In addition, if the spring 337 is not arranged between the spring compression member 336 and the target plate 314, target plate 314 may follow upward movement of the shaft 306 due to a biasing force exerted on a second side of the target plate 314 by a sleeve 327 fitted to the shaft 306. On the other hand, the target plate 314 may not follow the downward movement of the shaft 306, since the target plate 314 may not be securely affixed to the shaft 306. Therefore, the spring 337 may bias the target plate 314 against the sleeve 327 so that the target plate 314 follows the downward movement of the shaft 306.

Micro-position gap sensor assembly 300 may further include a printed circuit board 316 coupled to the non-contact sensor plate 312. The printed circuit board 316 may be configured to output a signal indicating a distance between the non-contact sensor plate 312 and the target plate 314. For example, the printed circuit board 316 may be configured to measure a capacitance of the non-contact sensor plate 312 and the target plate 314. Non-contact sensor plate 312 may be coupled to printed circuit board 316 and may be oriented within structural housing 302 such that shaft 306 passes through the center hole of each. The printed circuit board 316 may be positioned below and adjacent to the non-contact sensor plate 312.

Micro-position gap sensor assembly 300 may further include a flow control valve 340, shown in FIG. 10. The flow control valve 340 may be coupled to the micro-position gap sensor assembly 300 such that displacement of the shaft 306 changes a valve position of a control surface 346 of the flow control valve 340. In some embodiments, the flow control valve 340 may have a normally closed configuration in which a valve body part of the flow control valve 340 is biased against a valve seat of the flow control valve 340. In such embodiments, an upward displacement of the shaft 306 may open the flow control valve 340 and allow fluid to flow through the flow control valve 340. In other embodiments, the flow control valve may have a normally open configuration in which a valve body part of the flow control valve 340 is biased against a spring configured to prevent the valve body part from biasing against a valve seat of the flow control valve 340. In such embodiments, a downward displacement of the shaft 306 may close the flow control valve 340.

In a sixth embodiment, the position of the non-contact sensor plate 312 and the position of the target plate 314 may be switched. A schematic depiction of the parallel plate gap sensor 313 in such an embodiment is shown in FIG. 11. In such an embodiment, the non-contact sensor plate 312 may be biased by a second biasing force from a return spring 337 received at a first side of the non-contact sensor plate 312 and biasing the non-contact sensor plate 312 so that a second side of the non-contact sensor plate 312 is held against a portion of the shaft 306 in order to follow the downward movement of the shaft 306. The target plate 314 may be positioned adjacent the non-contact sensor plate 312 and separated therefrom by a gap. In addition, the target plate 314 may be biased by a first biasing force from the second retainer 310 that biases the target plate 314 so that a second side of the target plate 314 is held against the first retainer 308. The first retainer 308 may be configured as a step of the structural housing 202, and the second retainer 310 may be configured as a compression spring located at a first side of the target plate 314.

The fifth and sixth embodiments of FIGS. 8-11 have the potential advantages of reduced part count and ease of manufacture. Whereas first through fourth embodiments may include adjustment shims 118 and 218, the fifth and sixth embodiments do not include adjustment shims, and thus may have reduced part counts. The distance between the first retainer 308 and the second retainer 312 in the fifth and sixth embodiments may also have a higher tolerance for manufacturing error than the thickness of the adjustment shims 118 and 218 in the first through fourth embodiments, and thus may be easier and less costly to manufacture. Manufacturing the adjustment shims 118 and 218 to tolerances that would allow for accurate gap measurements may be costly relative to the fifth and sixth embodiments. Further, since the first retainer 310 may be integrated into the structural housing 302, the cost and complexity of manufacturing the fifth and sixth embodiments may be reduced. In addition, in the fifth and sixth embodiments, the first retainer 308 may not be a standoff washer, and instead may be a washer without standoffs. Since standoff washers may be costly to manufacture, the manufacturing costs of the fifth and sixth embodiments may be reduced.

PARTS LIST

Micro-position gap sensor assembly 100
Structural housing 102
Flexible diaphragm 104
Shaft 106
First retainer 108
Standoffs 109
Second retainer 110
Non-contact sensor plate 112
Parallel plate gap sensor 113
Target plate 114
Non-conductive sleeve 115
Printed circuit board 116
Adjustment shims 118
Wave compression spring ring 120
Jam retainer 122
Flow control valve 140
Valve shaft 144

Micro-position gap sensor assembly 200
Bottom body piece 202
Flexible diaphragm 204
Shaft 206
First retainer 208
Non-contact sensor plate 212
Target plate 214
Printed circuit board 216
Gap adjustment shim 218
Top body piece 228
Prime mover or actuator element 230
Prime mover housing 232
Bearing 234
Actuator return spring compression member 236
Actuator return spring 237
Prime mover housing locking ring 238
Flow control valve 240
Valve disk 242
Valve shaft 244
Micro-position gap sensor assembly 300
Structural housing 302
Sidewall 303
Flexible diaphragm 304
Central region 305
Shaft 306
Orthogonal direction 307
First retainer 308
Second retainer 310
Non-contact sensor plate 312
Parallel plate gap sensor 313
Target plate 314
Printed circuit board 316
Jam retainer 322
Bearing washer 325
Sleeve 327
Prime mover housing 332
Bearing 334
Spring compression member 336
Spring 337
Flow control valve 340
Control surface 346

It will be appreciated that the embodiments discussed above may also be applied to flow sensing, vibration sensing, prime mover performance, or mechanical defect detection in addition to the flow control applications described above.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A micro-position gap sensor assembly comprising:
a structural housing having a sidewall at least partially surrounding a central region;
a flexible diaphragm fixedly attached at a first end of the structural housing and forming a barrier against fluid ingress into the central region of the structural housing;
a shaft attached to the flexible diaphragm and extending in an orthogonal direction to a surface of the flexible diaphragm through the central region of the structural housing towards a second end of the structural housing opposite the first end;
a first retainer formed as an inwardly extending step in the sidewall of the central region of the structural housing; and
a second retainer including a compression spring, one end of the second retainer being secured against movement in the orthogonal direction;
a plate gap sensor, the plate gap sensor including:
a non-contact sensor plate; and
a target plate positioned adjacent the non-contact sensor plate and separated therefrom by a gap;
wherein one of the target plate and non-contact sensor plate is configured to follow the movement of the shaft, and the other of the target plate and non-contact sensor plate is retained by a biasing force of the second retainer, by being biased against the first retainer; and
wherein displacement of the one of the target plate and non-contact sensor plate that follows the movement of the shaft, caused by movement of the shaft, changes a distance between the target plate and the non-contact sensor plate.

2. The micro-position gap sensor assembly of claim 1, wherein the target plate is configured to follow the movement of the shaft, and the non-contact sensor plate is retained by the biasing force of the second retainer by being biased against the first retainer and thereby fixed in position relative to the structural housing; and
wherein displacement of the target plate caused by movement of the shaft changes the distance between the target plate and the non-contact sensor plate.

3. The micro-position gap sensor assembly of claim 2, wherein the non-contact sensor plate is biased by the biasing force from the second retainer received at a first side of the non-contact sensor plate and biasing the non-contact sensor plate so that a second side of the non-contact sensor plate is held against the first retainer.

4. The micro-position gap sensor assembly of claim 3, wherein the biasing force is a first biasing force, and wherein the target plate receives a second biasing force from a return spring received at a first side of the target plate and biasing the target plate so that a second side of the target plate is held against a portion of the shaft or a retaining structure that is coupled to the shaft.

5. The micro-position gap sensor assembly of claim 1, further comprising:
a printed circuit board coupled to the non-contact sensor plate, the printed circuit board configured to output a signal indicating a distance between the non-contact sensor plate and the target plate.

6. The micro-position gap sensor assembly of claim 1, wherein the non-contact sensor plate has a first central opening through which the shaft passes.

7. The micro-position gap sensor assembly of claim 1, further comprising:
a flow control valve coupled to the shaft of the micro-position gap sensor assembly such that displacement of the shaft changes a valve position of a control surface of the flow control valve.

8. The micro-position gap sensor assembly of claim 7, wherein the flow control valve has a normally closed configuration in which a valve body part of the flow control valve is biased against a valve seat of the flow control valve by a spring.

9. The micro-position gap sensor assembly of claim 7, wherein the flow control valve has a normally open configuration in which a valve body part of the flow control valve is biased against a spring configured to prevent the valve body part from biasing against a valve seat of the flow control valve.

10. The micro-position gap sensor assembly of claim 1, wherein the compression spring is a wave washer.

11. The micro-position gap sensor assembly of claim 1, wherein the step is created by a step down in thickness of the sidewall.

12. The micro-position gap sensor assembly of claim 11, wherein the sidewall is thicker on a side of the step toward the first end than on a side of the step toward the second end.

13. The micro-position gap sensor assembly of claim 1, wherein:
- the non-contact sensor plate is configured to follow the movement of the shaft, and the target plate is retained by biasing force of the second retainer by being biased against the first retainer and thereby fixed in position relative to the structural housing; and
- wherein displacement of the non-contact sensor plate caused by movement of the shaft changes the distance between the target plate and the non-contact sensor plate.

14. The micro-position gap sensor assembly of claim 1, wherein the target plate has a second central opening through which the shaft passes.

\* \* \* \* \*